(No Model.) 3 Sheets—Sheet 1.
L. GOLDBERG & A. L. FYFE.
APPARATUS FOR THE TRANSMISSION OF AN ELECTRIC CURRENT TO MOVING OBJECTS.
No. 316,139. Patented Apr. 21, 1885.
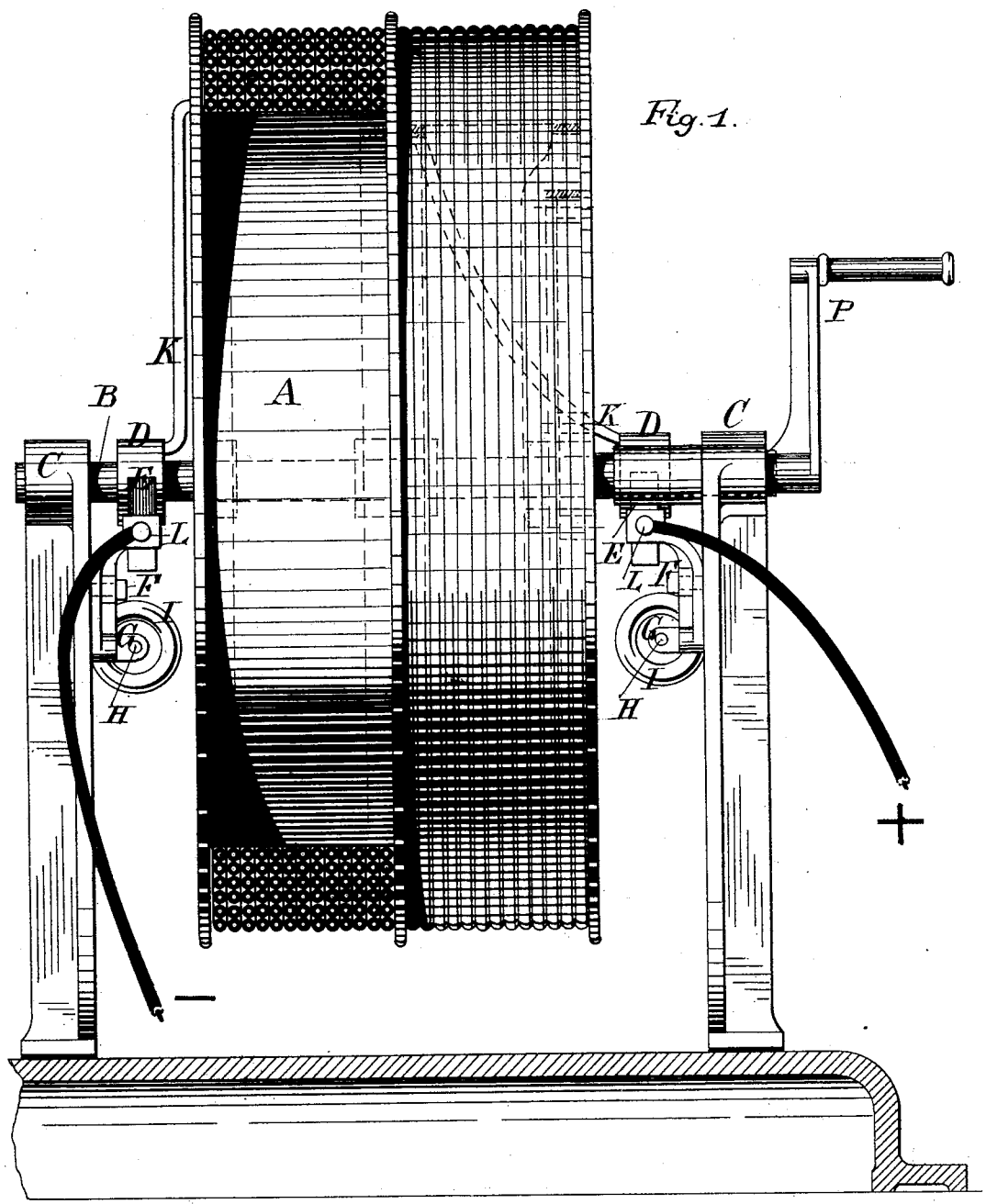

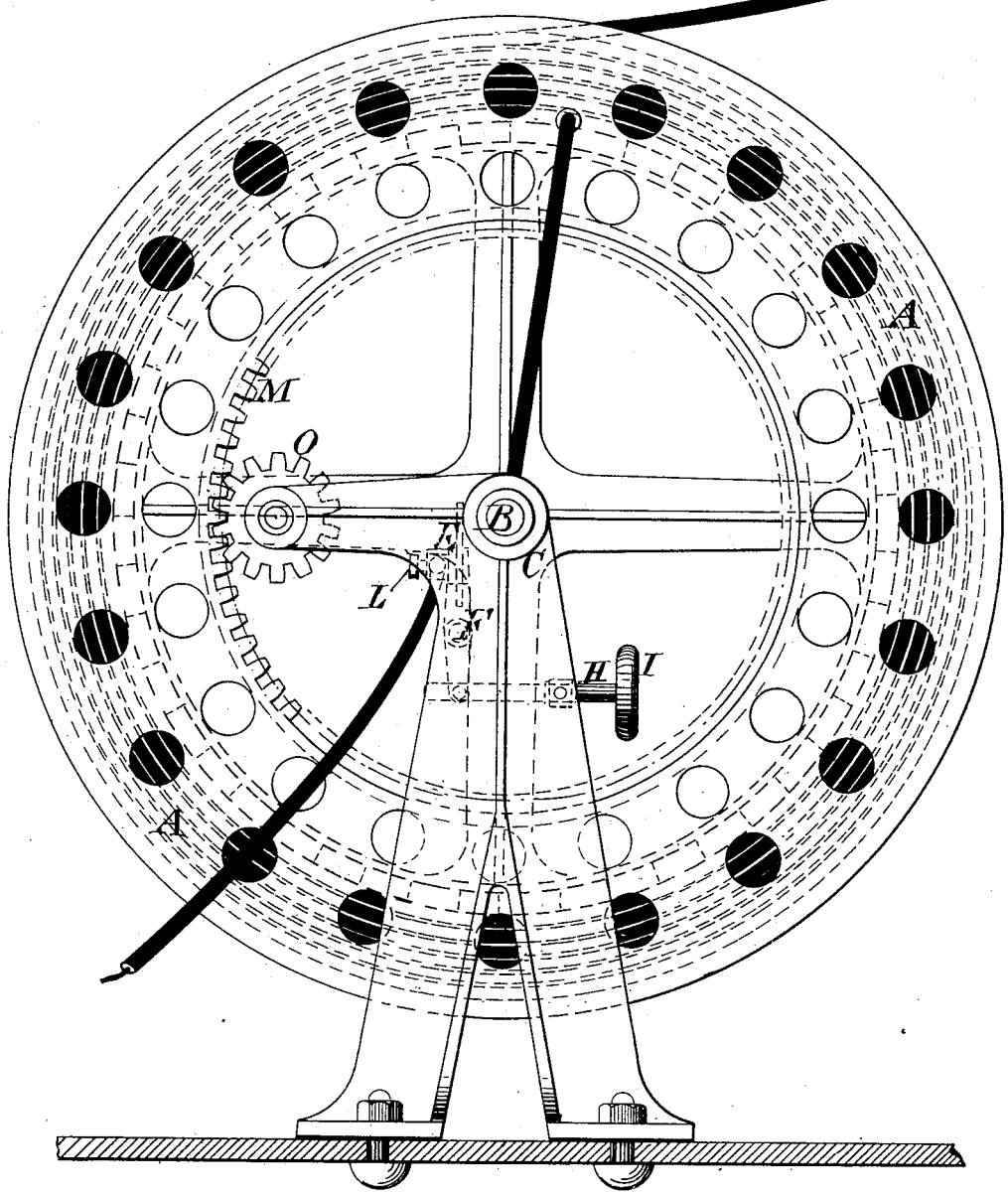

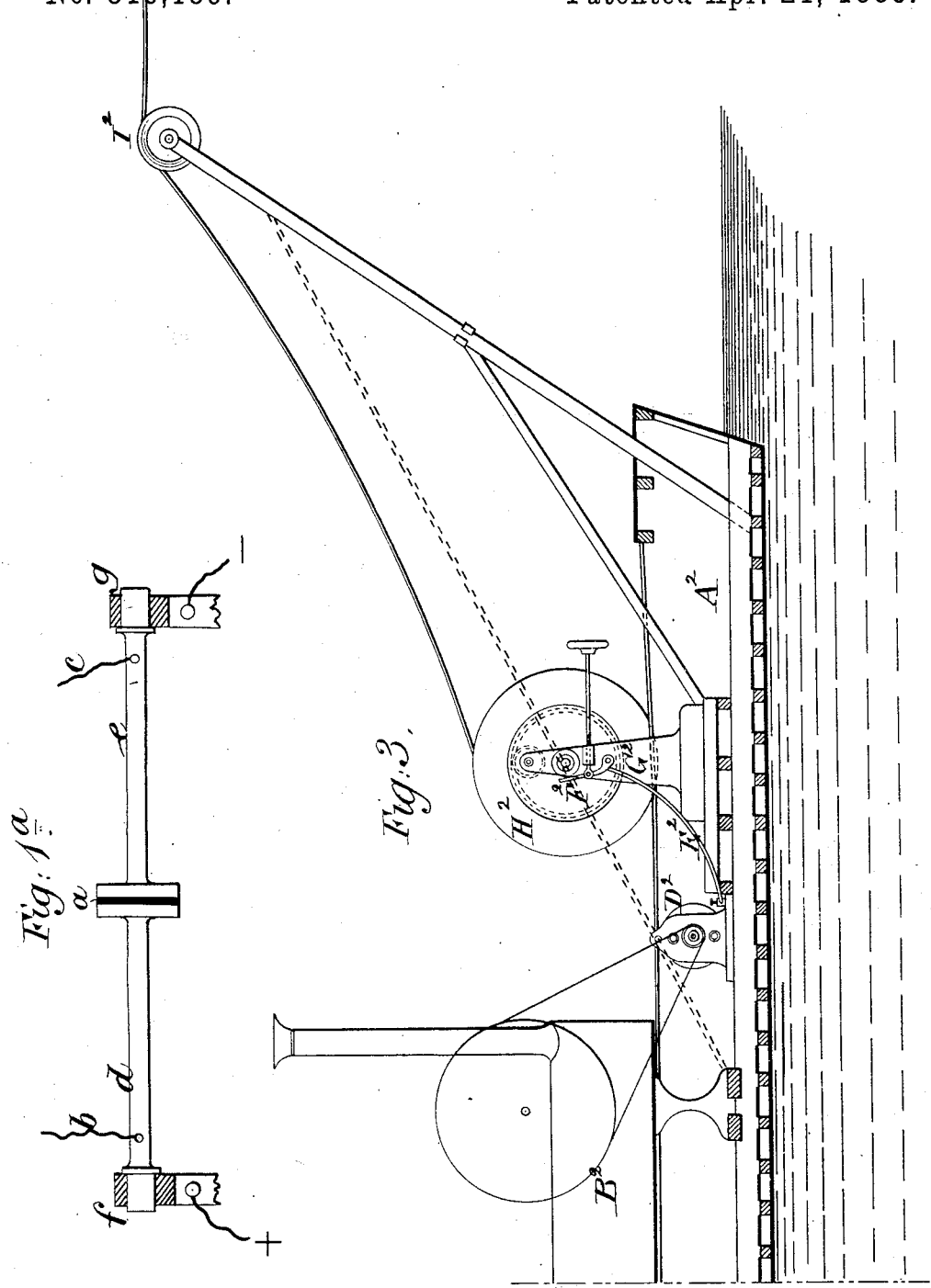

UNITED STATES PATENT OFFICE.

LOUIS GOLDBERG, OF LOVE LANE, LONDON, AND ALEXANDER LESLIE FYFE, OF LOUGHBOROUGH PARK, COUNTY OF SURREY, ENGLAND.

APPARATUS FOR THE TRANSMISSION OF AN ELECTRIC CURRENT TO MOVING OBJECTS.

SPECIFICATION forming part of Letters Patent No. 316,139, dated April 21, 1885.

Application filed May 26, 1884. (No model.)

*To all whom it may concern:*

Be it known that we, LOUIS GOLDBERG, of Love Lane, in the city of London, England, and ALEXANDER LESLIE FYFE, of Loughborough Park, in the county of Surrey, England, subjects of the Queen of Great Britain, have invented Improved Means and Apparatus for the Transmission of an Electric Current to Moving Objects, of which the following is a specification.

Our invention has for its object improved means and apparatus to be employed in the transmission of the electric current to electric lamps or electromotors that may be arranged on floating or other movable objects; and it consists, in the first place, of its adaptation to vessels or barges. In a flat-bottomed or other suitably-shaped barge are arranged the engine and boiler for the production of the power necessary to drive the dynamos to generate the electric current, such motive power, or it may be auxiliary engine, in some cases being employed for the propulsion of the said barge, or it may obviously be tugged, as desired. At a suitable distance from the dynamo we attach a reel or reels, on which are coiled the positive and negative wires to compensate for the varying space between the said barge and the vessel, or for other purposes, in a similar manner, when being employed for transmitting the electric current from shore to ship, or from ship to shore, or on land to any movably body, whether for the conveyance of the power necessary to drive the same or for the production of electric light or for other electrical purpose.

In the accompanying drawings, Figure 1 is a front elevation of the drum or drums, showing one coil of wire in section. Fig. 2 is a side elevation of the same.

A A are the drums, mounted on the axis B, having its bearings at each side in the standards C C. The axis B carries a ring, D, which is insulated therefrom, and electrical contact is made with this ring by a plate or brush, E, in a similar manner to the commutators in general use on dynamo-machines. The brush or plate E is pivoted at F, and at the other end of the arm is a swivel-nut, G, into which the screwed axis H of the hand-wheel I works, and by which means contact is effected or the current shut off at will by the attendant. The one end of the coil of wire is connected with the ring D, as shown at K, while the other end of the coil is connected to the distant apparatus, so that even while the wire is being drawn out contact is still maintained. The leads from the dynamo or other source of electricity are connected to the respective terminals L on the contact-maker before referred to, or the axes may be divided and insulated, as shown at $a$, Fig. 1$^a$, and the wires $b$ $c$ connected to the respective ends thereof, $d$ and $e$, while contact is made with the axis through the bearings $f$ and $g$, to which the current is directed from the machine.

When it is desired to draw in the wires, the drums can be rotated by gear-wheels—that is to say, one side of the drums can be provided with an internal ring of teeth, M, and into them engages a spur-pinion, O, which can be rotated either by hand or by power; but in the illustrations we have shown them actuated by an ordinary handle, P, connected to the pinion O by a clutch, so that in dealing out the wire the handle will not turn; or, to obviate the use of a clutch, we may employ a handle having an ordinary square socket.

In the application of these improvements to barges, as before described, we have illustrated the same in Fig. 3, which is a part longitudinal section thereof.

$A^2$ is the barge.

$B^2$ is an ordinary semi-portable engine transmitting power to the dynamo $D^2$.

$E^2$ is one of the leads connected to the contact-maker $F^2$, pivoted on the standards $G^2$.

$H^2$ is the drum showing one wire passing away over a friction or carrying pulley, $I^2$, supported by struts, or it may be in any other convenient manner; but we find it advantageously effected by the means shown.

We are aware that it is not new to transmit electrical currents to movable objects; but the devices heretofore used were of a complicated construction. It is upon this point we claim an improvement by having constructed a device of greater simplicity.

Having thus described our invention and in what manner the same is carried into effect, we would have it understood that what we claim is—

In an apparatus for the transmission of electrical currents to movable objects, the combination, substantially as shown and described, consisting of the drums A A, fixed to shaft or axis B, having their bearings in standards C C, the metallic rings D insulated from the shaft B, one of which is in electrical contact with one end of the positive conductor, while the other is in contact with the negative conductor, the brushes E, bearing upon the periphery of the metallic rings D, pivot F, swivel-nut G, the latter adapted to receive the screw H of the hand-wheel I, the internal gear, M, of the drums A A, adapted to engage with a pinion, O, rotated by the handle P, the whole forming a complete device.

LOUIS GOLDBERG.
ALEXANDER LESLIE FYFE.

Witnesses:
JOHN DEAN,
J. WATT,
*Both of 17 Gracechurch Street, London.*